United States Patent [19]

Cassey

[11] E Patent Number: Re. 33,173

[45] Reissued Date of Patent: Feb. 27, 1990

[54] ENVELOPE WITH POUCH AND METHOD OF MANUFACTURE THEREOF

[75] Inventor: Russel A. Cassey, Hamilton, New Zealand

[73] Assignee: Trigon Packaging Systems (NZ) Ltd., New Zealand

[21] Appl. No.: 200,530

[22] Filed: May 31, 1988

Related U.S. Patent Documents

Reissue of:

[64] Patent No.: 4,648,860
Issued: Mar. 10, 1987
Appl. No.: 703,822
Filed: Feb. 21, 1985

[30] Foreign Application Priority Data

Feb. 23, 1984 [NZ] New Zealand ..... 207248

[51] Int. Cl.[4] ..... B31B 41/10

[52] U.S. Cl. ..... 493/195; 493/216; 493/347; 493/920; 383/40; 229/72

[58] Field of Search ..... 493/195, 210, 212, 213, 493/214, 216, 254, 347, 382, 920, 927, 931, 932; 206/632; 229/72; 383/38, 40, 93, 95

[56] References Cited

U.S. PATENT DOCUMENTS

| | | | |
|---|---|---|---|
| 2,819,010 | 1/1958 | Amiguet | 383/93 |
| 3,147,674 | 9/1964 | Hoeppner | 493/210 |
| 3,424,636 | 1/1969 | Brody | 493/347 |
| 3,456,867 | 7/1969 | Repko | 383/93 |
| 3,472,129 | 10/1969 | Alexandrou | 493/347 |
| 3,512,457 | 5/1970 | Watanabe | 206/632 |
| 3,595,468 | 7/1971 | Repko | 206/632 |
| 3,680,768 | 8/1972 | Warren | 383/40 |
| 3,906,844 | 9/1975 | Gougeon | 493/347 |
| 3,998,135 | 12/1976 | Sargent | 493/216 |
| 4,192,447 | 3/1980 | Ambrosat et al. | 229/72 |
| 4,256,256 | 3/1981 | Meyers | 383/40 |
| 4,273,549 | 6/1981 | Pezzana et al. | 493/196 |
| 4,393,989 | 7/1983 | Maclin et al. | 229/72 |
| 4,638,940 | 1/1987 | Skokos et al. | 229/72 |

*Primary Examiner*—William Terrell
*Attorney, Agent, or Firm*—Harry M. Cross, Jr.

[57] ABSTRACT

A method of producing an envelope having an integrally formed external pouch on one side for accommodating a despatch note, waybill or the like, comprises the steps of longitudinally folding a sheet of plastics material from a first reel and transporting the folded plastics sheet to a downstream sealing station while simultaneously feeding a strip of sheet plastics to overlie the folded plastics of the first reel to be transported therewith, and sealing folded plastics to form the envelope while simultaneously applying the same process to the strip plastics, to form the pouch on one wall of the envelope.

3 Claims, 1 Drawing Sheet

ENVELOPE WITH POUCH AND METHOD OF MANUFACTURE THEREOF

Matter enclosed in heavy brackets [ ] appears in the original patent but forms no part of this reissue specification; matter printed in italics indicates the additions made by reissue.

This invention relates to methods of manufacturing envelopes.

The present invention is particularly relevant to envelopes such as those used by internal and international courier services where a courier pack is despatched with a despatch note. In the case of the international courier mail it is a requirement of the pack that it be able to be opened by local customs and then resealed, and further the courier pack is invariably accompanied by a despatch slip used by the courier as a customs, despatch and receipt form. At present the courier packs which are used by the international couriers are plain envelopes and the despatch forms are generally clipped or stapled to the pack. Often by the time the process of collection and delivery has been achieved the despatch form is damaged, misplaced or mislaid.

It is an object of the present invention to provide a method of producing an envelope which will provide a separate pouch for despatch notes or the like.

Further objects and advantages of the present invention will become apparent from the ensuing description which is given by way of example.

According to the present invention there is provided a method of producing an envelope comprising the steps of longitudinally folding a sheet of plastics material from a first reel and transporting the folded plastics sheet to a downstream sealing, stitching or seaming station whilst simultaneously feeding a strip of sheet plastics to overlie the folded plastics of the first reel to be transported therewith, and sealing, stitching or seaming the folded plastics to form an envelope or a series of same whilst simultaneously applying the same process to the strip plastics, to form a pouch on at least one wall of the envelope.

Figure 1:
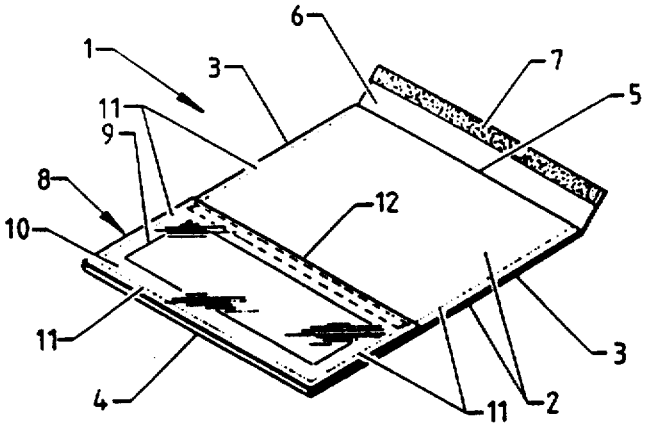
Figure 2:
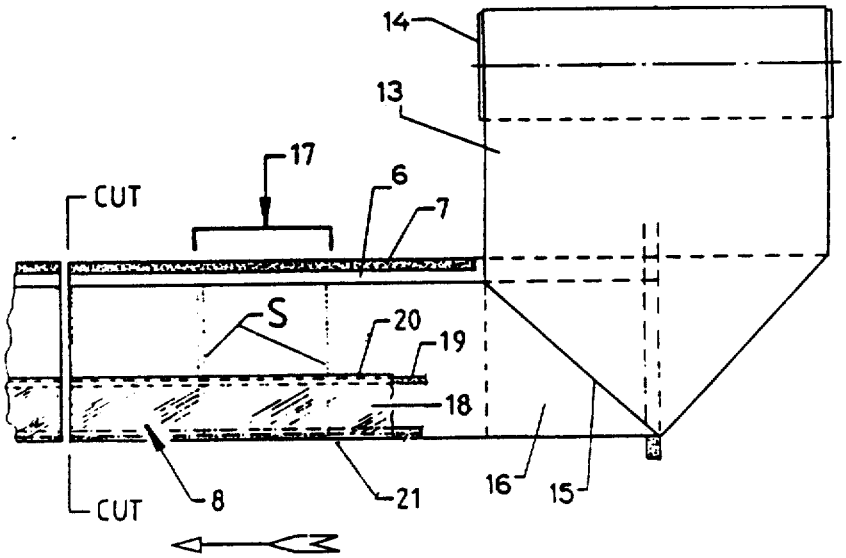

Aspects of the present invention will now be described by way of example only with reference to the accompanying drawings in which:

FIG. 1: is a diagrammatic perspective view of an envelope with pouch in accordance with one possible embodiment of the present invention, and FIG. 2: is a diagrammatic plan view of an apparatus/-process for producing an envelope and pouch in accordance with the present invention.

With respect to FIG. 1 of the drawings, an envelope in accordance with the present invention generally indicated by arrow 1 comprises a body 2 having closed sides 3, one closed end 4 and one open end 5 where there is situated a flap 6. The flap 6 is provided with a sealing strip 7 which can be in the form of a peelable adhesive tape, VELCRO or a re-usable adhesive strip. Domes or clips (not shown) may be used to hold the flap in a closed position relative to the envelope body 2.

In accordance with the present invention the envelope 1 is provided with a pouch generally indicated by arrow 8 which can be used to accommodate a despatch slip 9 or other articles such as a letter. The pouch is formed by laying a strip of plastics material 11 over the base of one side of the envelope 1 and sealing, adhering or seaming the edges 11 so that there is provided an opening 12 which is sealable against the adjacent body part 2 of the envelope 1 using a sealing tape, VELCRO or other means as described in relation to the envelope flap 6.

The envelope 1 is by preference manufactured from a laminate or co-extrusion having inner layers of plastics and an outer layer of mica-filled or impregnated high density polyethlene. Such film provides an appropriate degree of toughness and on the outer surface where there is often a requirement to print or write on the surface, the surface is such that inks, labels or the like can be easily applied. The strip plastics 10 used for forming the pouch is preferably a transparent plastics so that the contents of the pouch can be readily viewed, although this is not essential to the present invention.

With respect to FIG. 2 of the drawings, an envelope in accordance with the present invention can be manufactured by a process comprising forming an envelope having at least one open end while simultaneously forming an openable pouch on at least one side of the envelope.

The process illustrated by FIG. 2 by way of example, involves longitudinally folding a sheet 13 of plastics material from a first supply reel 14 using conventional film folding means 15 and transporting folded film 16 to a downstream sealing or sticking area generally indicated by arrow 17 whilst simultaneously feeding a strip of plastics material 18 from an overhead reel supply source (not shown) to overlie folded plastics 16 so that the strip material 18 is transported with the folded film 16 to the sealing or sticking position.

Where the process of the present invention is used to produce an envelope with pouch such as is described and shown in relation to FIG. 1 of the drawings, a peelable tape 7 from a supply source (not shown) is added to the underlying extensible portion illustrated in FIG. 2, which in the finished product is the envelope flap 6. Similarly a peelable tape 19 is applied to the edge 20 of the strip plastics material 18, and optionally may be applied to the lower edge 21 of said strip plastics material 18 although it is preferred that, all edges of the strip plastics except at the opening of the pouch, be permanently closed and sealed perhaps using hot-melted adhesive. The peelable tape 7 is applied with the peel strip facing up whilst the peelable tape applied to edges 20 (and optionally edges 21) is applied with the peel strip facing down.

At the sealing station 17 the plastics 16 and the strip plastics material 18 is sealed or adhered at S, and downstream of the sealing and sticking position a cross-wise cut between the pre-formed envelopes is made severing the envelopes. Where the pouch 8 is to be opened from both ends the strip plastics material 18 can be positioned centrally of the folded plastics material 16, however when the bottom of the pouch 8 is to be permanently sealed this operation can be carried out at the sealing station 17.

Aspects of the present invention have been described by way of example only and it is to be appreciated that modifications and additions thereto may be made without departing from the scope of the present invention as defined in the appended claims.

We claim:

1. A method of producing a courier pack envelope incorporating an external pouch, characterized by the steps of:

progressively folding a continuous sheet of plastics material to provide juxtaposed sheet portions interconnected at one of their longitudinal edges by the bight of said fold;

transporting said folded sheet in a longitudinal direction;

progressively feeding a continuous strip of plastics material of a determined width-longitudinally into face engagement with an outwardly presented face of one of said sheet portions;

*providing a supply of a continuous peelable adhesive-carrying tape having a peel strip, and applying said tape to said strip of plastics material adjacent one edge of said strip of plastics material with the peel strip facing said plastics material;* progressively attaching one edge of said strip *of plastics material* continuously to said face during the feeding of said strip *of plastics material*; and, sealing each of said folded sheet portions and said attached strip *of plastics material* to each other at positions spaced longitudinally of said folded sheet, and along lines extending transversely of said folded sheet and said strip *of plastics material*;

whereby said strip *of plastics material* is attached to said outwardly presented face of one of said sheet portions along three of its edges and defines an open-sided pouch in conjunction with said outwardly presented face of said one sheet portion;

*said tape being applied to the edge of said strip of plastics material adjacent the open end of said open-sided pouch whereby the open side of said pouch is sealable by peeling said peel strip away securing the upper edge of said strip of plastics material to said one sheet portion.*

2. A method of producing an envelope as claimed in claim 1, including the step of forming individual envelopes by making sequential cross-wise cuts through the sequential transverse lines of securement of said folded sheet and said strip.

3. The method of producing a courrier pack envelope according to claim 1, wherein said step of progressively feeding includes:

aligning said one edge of said strip with said fold of said folded sheet.

* * * * *